United States Patent
Ma

(10) Patent No.: US 11,659,586 B1
(45) Date of Patent: May 23, 2023

(54) APPARATUS FOR SWITCHING FREQUENCY BAND IN MESH NETWORK AND METHOD THEREOF

(71) Applicant: Realtek Singapore Private Limited, Singapore (SG)

(72) Inventor: Xiu Ma, Singapore (SG)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 1 day.

(21) Appl. No.: 17/580,691

(22) Filed: Jan. 21, 2022

(30) Foreign Application Priority Data

Dec. 10, 2021 (TW) ................................ 110146449

(51) Int. Cl.
*H04W 72/542* (2023.01)
*H04L 12/44* (2006.01)
*H04W 36/06* (2009.01)
*H04W 84/18* (2009.01)

(52) U.S. Cl.
CPC ........... *H04W 72/542* (2023.01); *H04L 12/44* (2013.01); *H04W 36/06* (2013.01); *H04W 84/18* (2013.01)

(58) Field of Classification Search
CPC ... H04W 72/542; H04W 36/06; H04W 84/18; H04L 12/44
See application file for complete search history.

(56) References Cited

U.S. PATENT DOCUMENTS

2018/0103505 A1 * 4/2018 Amini ..................... H04W 4/30

FOREIGN PATENT DOCUMENTS

| CN | 111432504 A | 7/2020 | |
|----|-------------|--------|---|
| CN | 113316173 A | 8/2021 | |
| CN | 113543276 A | 10/2021 | |
| EP | 3826195 A1 * | 5/2021 | ............. H04B 7/026 |

* cited by examiner

*Primary Examiner* — Jianye Wu
(74) *Attorney, Agent, or Firm* — McClure, Qualey & Rodack, LLP

(57) ABSTRACT

A method for switching frequency band in a mesh network including a plurality of access points is provided. The method includes turning off one of two communication ports of a second backhaul station of an idle node when the idle node is in an on-boarding phase and the two communication ports are turned on, so that the idle node joins the mesh network by communicatively connecting to a first backhaul station of one of the access points through the turned on communication port. The two communication ports operate in different frequency bands. A first fronthaul station of each of the access points is configured to provide a communication connection for at least one user terminal. A second fronthaul station of the idle node is configured to provide a communication connection for the at least one user terminal after the idle node joins the mesh network.

20 Claims, 4 Drawing Sheets

APPARATUS FOR SWITCHING FREQUENCY BAND IN MESH NETWORK AND METHOD THEREOF

CROSS-REFERENCE TO RELATED APPLICATION

This non-provisional application claims priority under 35 U.S.C. § 119(a) to Patent Application Ser. No. 110146449 in Taiwan, R.O.C. on Dec. 10, 2021, the entire contents of which are hereby incorporated by reference.

BACKGROUND

Technical Field

The present invention relates to a network technology, and in particular, to a frequency band switching apparatus for a mesh network and a method thereof.

Related Art

There are many wireless or wired networking devices nowadays, and demand for connecting multiple devices to each other to form a local area network (LAN) is increasing. General networking devices may support multiband communication connections. For example, the multiband may include 2.4 GHz, 5 GHz, or the like. The networking device can only establish one communication connection by using one of the frequency bands at a time; otherwise a network loop may occur. The multiband-supporting networking device may improve the stability of the communication connection and the stability of a network service. For example, when a received signal strength indication (RSSI) of a frequency band for a communication connection between two networking devices becomes weak, a user may set the two networking devices to make the two networking devices communicatively connected by using another frequency band.

However, when the user sets the two networking devices, the two networking devices will re-network. As a result, switching between multiple frequency bands cannot be performed quickly, affecting the network service provided to the user by the two networking devices. For example, because the frequency bands cannot be quickly switched, the two networking devices may be in a disconnected state.

SUMMARY

According to the above, the present invention provides a frequency band switching apparatus for a mesh network and a method thereof. A frequency band switching apparatus for a mesh network includes a plurality of access points and an idle node. The access points are communicatively connected to each other to form a mesh structure of the mesh network. Each of the access points includes a first fronthaul station and a first backhaul station. The first fronthaul station of each of the access points is configured to provide a communication connection for at least one user terminal. The idle node includes a second fronthaul station, a second backhaul station, and a processing circuit. The second fronthaul station is configured to provide a communication connection for the at least one user terminal after the idle node joins the mesh network. The second backhaul station includes two communication ports. The two communication ports include a first communication port and a second communication port. The first communication port is configured to operate in a first frequency band, and the second communication port is configured to operate in a second frequency band different from the first frequency band. The processing circuit is configured to turn off one of the two communication ports in an on-boarding phase and when the two communication ports are turned on, so that the idle node joins the mesh network by communicatively connecting to the first backhaul station of one of the access points through the turned on communication port.

A frequency band switching method is adapted to a mesh network including a plurality of access points. The frequency band switching method for the mesh network includes turning off one of two communication ports of a second backhaul station of an idle node when the idle node is in an on-boarding phase and the two communication ports are turned on, so that the idle node joins the mesh network by communicatively connecting to a first backhaul station of one of the access points through the turned on communication port. The two communication ports include a first communication port and a second communication port. The first communication port is configured to operate in a first frequency band, and the second communication port is configured to operate in a second frequency band different from the first frequency band. The access points are communicatively connected to each other to form a mesh structure of the mesh network. A first fronthaul station of each of the access points is configured to provide a communication connection for at least one user terminal. A second fronthaul station of the idle node is configured to provide a communication connection for the at least one user terminal after the idle node joins the mesh network.

Based on the above, according to some embodiments, the present invention can quickly switch between frequency bands without re-networking. In some embodiments, the present invention can accurately select a frequency band used when a networking device (such as a node) is to join a local area network (such as a mesh network) in an on-boarding phase.

DETAILED DESCRIPTION

Figure 1:
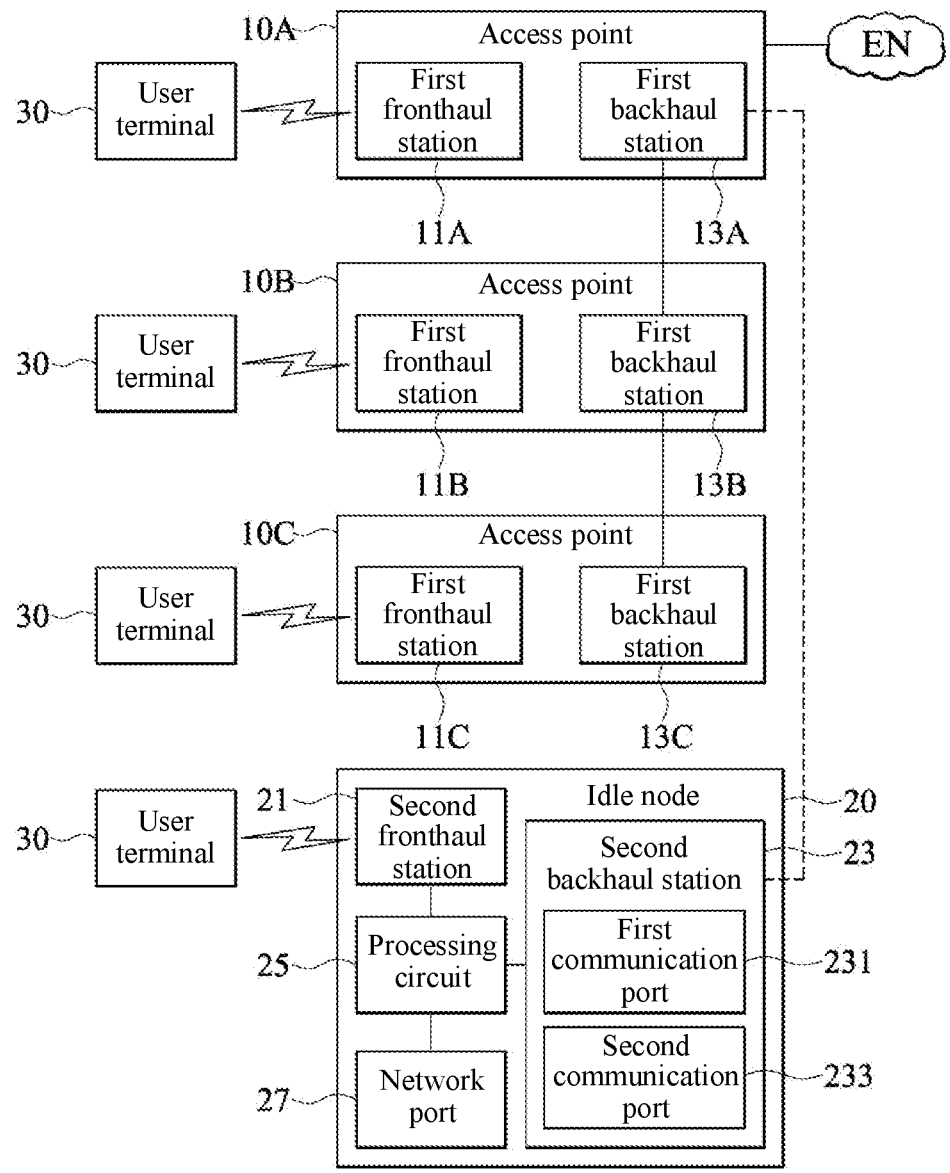
FIG. 1 is a schematic architectural diagram of a mesh network according to some embodiments of the present invention.

Refer to FIG. 1, which is a schematic architectural diagram of a mesh network according to some embodiments of the present invention. The mesh network includes a plurality of access points 10A to 10C. The access points 10A to 10C are communicatively connected to each other to form a mesh structure of the mesh network, and connect to an external network EN through a network topology of the mesh structure. Although the three access points 10A to 10C are shown in FIG. 1, the present invention is not limited thereto, and the number of the access points may be less than three or more than three according to the needs of the user. The mesh network is, for example, a Wi-Fi EasyMesh. The access points 10A to 10C are, for example, apparatuses such as routers and gateways that have a packet forwarding function and a packet receiving function. The external network EN is, for example, a wide area network (WAN), and the mesh network may be a local area network. The communication connection between the access points 10A to 10C may be a wired communication connection or a wireless communication connection. The wireless communication connection is, for example, a Wi-Fi communication connection.

In this specification, a band switching apparatus that has not become an access point in the mesh network is referred to as an "idle node" (for example, an idle node 20 shown in FIG. 1). In this specification, the term "on-boarding" or "on-boarding phase" is described, which refers to a process of adding an idle node to the mesh network. In this specification, the term "networked" or "networked phase" is described, which means that an idle node has joined the mesh network. In some embodiments, the idle node has a similar structure to the access points 10A to 10C.

Each of the access points 10A to 10C may further communicatively connect to at least one user terminal 30. After the idle node 20 joins the mesh network, at least one user terminal 30 may be communicatively connected. The user terminal 30 is, for example, a notebook computer, a desktop computer, a tablet computer, a personal mobile device, or the like. Although the four user terminals 30 are shown in FIG. 1, the present invention is not limited thereto, and the number of the user terminals may be less than four or more than four according to the needs of the user. The communication connection between the access points 10A to 10C (or the idle node 20) and the user terminal 30 may be a wired communication connection or a wireless communication connection. The wireless communication connection is, for example, a Wi-Fi communication connection or a Bluetooth communication connection.

Each of the access points 10A to 10C includes a first fronthaul station 11A to 11C and a first backhaul station 13A to 13C. The first fronthaul station 11A to 11C of each of the access points 10A to 10C is configured to provide a communication connection for the at least one user terminal 30. The first backhaul station 13A to 13C is configured to provide a communication connection for the access points 10A to 10C and the idle node 20. In some embodiments, the first fronthaul stations 11A to 11C and the first backhaul stations 13A to 13C provide a wireless communication connection function. For example, each of the access points 10A to 10C has at least an antenna, and the first fronthaul stations 11A to 11C and the first backhaul stations 13A to 13C establish a wireless communication connection through the antenna. In some embodiments, the first fronthaul stations 11A to 11C and the first backhaul stations 13A to 13C each may be implemented by a wireless communication interface. In some embodiments, the first fronthaul stations 11A to 11C and the first backhaul stations 13A to 13C may be integrated and implemented by a single wireless communication interface.

The idle node 20 includes a second fronthaul station 21, a second backhaul station 23, and a processing circuit 25. The processing circuit 25 is electrically connected to the second fronthaul station 21 and the second backhaul station 23. The second backhaul station 23 is configured to provide a communication connection for the access points 10A to 10C. The second fronthaul station 21 is configured to provide a communication connection for the user terminal 30 after the idle node 20 joins the mesh network. In some embodiments, similar to the access points 10A-40C, the second fronthaul station 21 and the second backhaul station 23 provide a wireless communication connection function. For example, the idle node 20 has at least an antenna, and the second fronthaul station 21 and the second backhaul station 23 establish a wireless communication connection through the antenna. In some embodiments, the second fronthaul station 21 and the second backhaul station 23 each may be implemented by a wireless communication interface. In some embodiments, the second fronthaul station 21 and the second backhaul station 23 may be integrated and implemented by a single wireless communication interface. In some embodiments, the processing circuit 25 may be implemented by an arithmetic circuit such as a central processing unit, a microprocessor, or an application-specific integrated circuit (ASIC).

The second backhaul station 23 includes two communication ports. The two communication ports include a first communication port 231 and a second communication port 233. The first communication port 231 is configured to operate in a first frequency band. The second communication port 233 is configured to operate in a second frequency band different from the first frequency band. For example, the first frequency band is 5 GHz, and the second frequency band is 2.4 GHz. In some embodiments, the first frequency band is greater than the second frequency band. In some embodiments, the two communication ports are electrically connected to the antenna of the idle node 20, and at any time point in an on-boarding phase and an networked phase, the idle node 20 communicatively connects to the access points 10A to 10C through one of the two communication ports (that is, one of the first communication port 231 and second communication port 233) and the antenna. In this way, a network loop can be avoided.

In some embodiments, the idle node 20 further includes a network port 27. The network port 27 is electrically connected to the processing circuit 25. The network port 27 is configured to provide a communication connection for the access points 10A to 10C. In some embodiments, the network port 27 provides a wired communication connection function. For example, the network port 27 establishes a wired communication connection through a network cable. In some embodiments, the network port 27 may be implemented by a wired communication interface.

Figure 2:
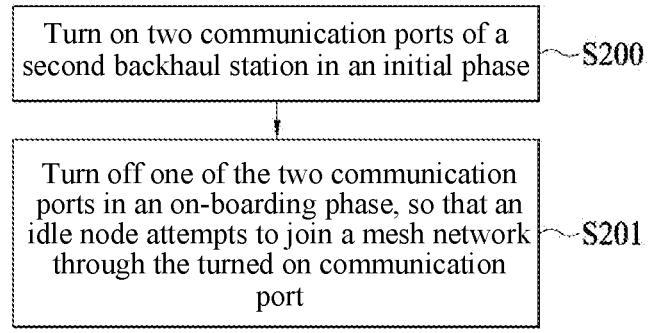
FIG. 2 is a schematic flowchart of a frequency band switching method for a mesh network in an on-boarding phase according to some embodiments of the present invention.

Refer to FIG. 2, which is a schematic flowchart of a frequency band switching method for a mesh network in an on-boarding phase according to some embodiments of the present invention. The frequency band switching method is adapted to be executed by the processing circuit 25. First, the idle node 20 is powered on to start up, and enters an initial phase. In the initial phase, the processing circuit 25 turns on the two communication ports of the second backhaul station 23 (step S200). In some embodiments, the processing circuit includes a daemon module. In the initial phase, the daemon module is awakened, and the two communication ports of the second backhaul station 23 are turned on by the daemon module module. After the two communication ports are turned on, the idle node 20 enters the on-boarding phase.

When the idle node 20 is in the on-boarding phase and the two communication ports are turned on, the processing circuit 25 turns off one of the two communication ports, so that the idle node 20 joins the mesh network by communicatively connecting to the first backhaul station 13A to 13C of one of the access points 10A to 10C through the turned on communication port (step S201). In some embodiments, when the idle node 20 is in the on-boarding phase and the two communication ports are turned on, the processing circuit 25 turns off one of the two communication ports, so that the band switching apparatus for implementing the idle node 20 joins the mesh network by communicating with the first backhaul station 13A to 13C of one of the access points 10A to 10C through the turned on communication port. In other words, one of the two communication ports is turned off and the other is turned on at any time point in the on-boarding phase. For example, as shown in FIG. 1, the processing circuit 25 turns off the first communication port 231, so that the idle node 20 joins the mesh network by communicatively connecting to the first backhaul station 13A of the access point 10A through the turned on second communication port 233. In this way, there is no need for the user to preset the second backhaul station 23 of the idle node 20 and the first backhaul stations 13A to 13C of the access points 10A to 10C to the same frequency band, and the idle node 20 can automatically select a communication port suitable for communication connection with the access points 10A-10C during the on-boarding phase, thereby avoiding a network loop.

Figure 3:
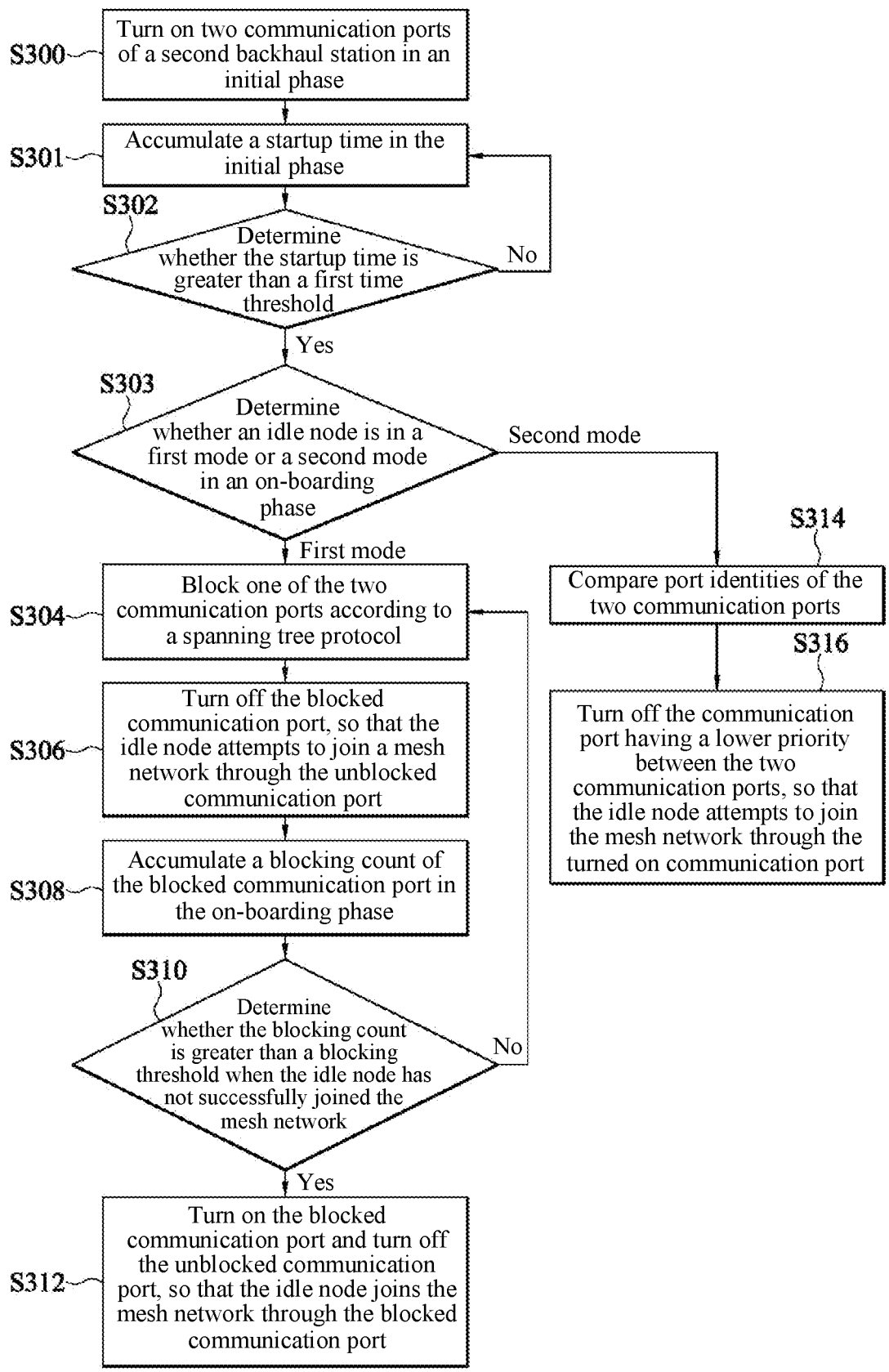
FIG. 3 is a schematic flowchart of the frequency band switching method for the mesh network in the on-boarding phase according to some embodiments of the present invention.

Refer to FIG. 3, which is a schematic flowchart of the frequency band switching method for a mesh network in the on-boarding phase according to some embodiments of the present invention. Here, because step S300 is the same as step S200, the description will not be repeated. In some embodiments, the idle node 20 has a first mode and a second mode. In some embodiments, the idle node 20 has a setting interface for the user to set the idle node 20 to the first mode or the second mode. The setting interface is, for example, a web management interface (having a web server allowing users to operate online through a web browser) or a management application (displaying a management interface for users to operate through a local or external screen, keyboard, or the like of the idle node 20). The setting interface is electrically connected to the processing circuit 25. In the initial phase, the user inputs a setting instruction to the processing circuit 25 through the setting interface. The processing circuit 25 is in the first mode or the second mode in response to the setting instruction, and turns on the two communication ports of the second backhaul station 23, to enter the on-boarding phase. The description is made using a web management interface as the setting interface. The web management interface (that is, the setting interface) detects an item selected by the user in the web management interface (for example, select the first mode or select the second mode) The web management interface generates a setting instruction in response to the selected item, and inputs the setting instruction to the processing circuit 25.

In some embodiments, in the initial phase, the processing circuit 25 further accumulates a startup time (step S301). For example, the processing circuit 25 accumulates the startup time through a timer. Next, in a case that the two communication ports of the second backhaul station 23 are turned on, the processing circuit 25 determines whether the startup time is greater than a first time threshold (step S302). When the startup time is greater than the first time threshold, the idle node 20 enters the on-boarding phase, and executes step S303 and its subsequent steps. When the startup time is not greater than the first time threshold, the processing circuit 25 returns to execute step S301 to continue accumulating the startup time. In this way, it is ensured that the daemon module is awakened normally, thereby ensuring that the subsequent processes (such as steps S303 to S316) can be performed normally. In some embodiments, the first time threshold may be stored in the processing circuit 25 in advance. In some embodiments, the first time threshold may be set to 10 seconds.

After the idle node 20 enters the on-boarding phase, the processing circuit 25 executes steps S304 to S312 when determining that the idle node 20 is in the first mode (step S303), and executes steps S314 to S316 when determining that the idle node 20 is in the second mode (step S303). Specifically, in the on-boarding phase and when the two communication ports are turned on, in a case that the idle node 20 is in the first mode, the processing circuit 25 executes steps S304 to S312. In the on-boarding phase and when the two communication ports are turned on, in a case that the idle node 20 is in the second mode, the processing circuit 25 executes steps S314 to S316.

In step S304, the processing circuit 25 blocks one of the two communication ports according to a spanning tree protocol (STP). For example, the processing circuit 25 defines one of the two communication ports as a root port and the other as a designated port according to the STP and a path cost from each communication port to a root bridge. The processing circuit 25 blocks the communication port defined as the designated port, to ensure that the network loop is disconnected. For example, if the second communication port 233 is defined as the designated port, the processing circuit 25 blocks the second communication port 233. The root bridge is an access point closest to the external network EN or an access point that directly communicatively connects to the external network EN in the mesh network. For example, as shown in FIG. 1, the root bridge is the access point 10A. In some embodiments, the processing circuit 25 may classify different transmission speeds into different path costs according to the STP. In other words, the path cost is determined according to a transmission speed of the communication port. For example, if the transmission speed of the first communication port 231 is 6.77 Gbps, the path cost is 2, and if the transmission speed of the second communication port 233 is 600 Mbps, the path cost is 19. The higher the transmission speed, the lower the path cost. The lower the transmission speed, the higher the path cost. In other words, a low path cost indicates that the communication port can provide a good communication connection, and a high path cost indicates that the communication port provides a poor communication connection. In some embodiments, a communication port with a lower frequency band has a higher path cost, and a communication port with a higher frequency band has a lower path cost. For example, the first frequency band of the first communication port 231 is higher than the second frequency band of the second communication port 233, and thus the first communication port 231 has a lower path cost, and the second communication port 233 has a higher path cost. In some embodiments, the processing circuit 25 defines the communication port having a lower path cost between the two communication ports as the root port stipulated by the STP, and defines the other as the designated port stipulated by the STP.

In some embodiments, the access points 10A to 10C and the idle node 20 have a configuration file. The configuration file is used to define node types of the access points 10A to 10C and the idle node 20. The configuration file may be network topology settings of the access points 10A to 10C and the idle node 20. The node types include a controller node type and an agent node type. For example, a description will be made using an example in which the mesh network is a Wi-Fi easy mesh network. In the specification of the Wi-Fi easy mesh network, the access points 10A to 10C and the idle node 20 may be divided into controller nodes (that is, the access points 10A to 10C and idle node 20 that are defined as the controller node type) and agent nodes (that is, the access points 10A to 10C and idle node 20 that are defined as the agent node type). The controller node is configured to connect the agent nodes to the Wi-Fi easy mesh network, and manage the operation of the agent nodes. For example, the controller node manages an operating channel of the agent nodes, a data stream topology structure, and user roaming between nodes. In some embodiments, the mesh network may only have one controller node and a plurality of agent nodes, and the controller node is to communicatively connect to the external network EN. For example, as shown in FIG. 1, the controller node is the access point 10A, and the agent nodes are the access points 10B and 10C and the idle node 20. In some embodiments, the controller node is used as the root bridge.

In step S306, the processing circuit 25 turns off the blocked communication port, so that the idle node 20 attempts to join the mesh network by communicatively connecting to the first backhaul station 13A to 13C of one of the access points 10A to 10C through the unblocked communication port. For example, assuming that the second communication port 233 is defined as the designated port, the second communication port 233 is the blocked communication port in step S304, and the first communication port 231 is the unblocked communication port. Because the blocked communication port can still send or receive small amounts of data, by turning off the blocked communication port, it can ensure that the unblocked communication port will not be affected by the blocked communication port when attempting to be on board and attempting to join the mesh network.

In step S308, the processing circuit 25 accumulates a blocking count of the blocked communication port in the on-boarding phase. For example, in the on-boarding phase, the processing circuit 25 performs multiple handshaking procedures (for example, an autoconfig program and a config push button program). In each handshaking procedure, the processing circuit 25 blocks the blocked communication port again, turns off the blocked communication port again, and reattempts to join the mesh network through the unblocked communication port. In other words, in the on-boarding phase, step S304 and step S306 are executed for multiple times, and the blocking count accumulated by the processing circuit 25 corresponds to the number of times that step S304 or step S306 is executed. In some embodiments, the processing circuit 25 accumulates the blocking count of the blocked communication port by using a counter.

In step S310, when the idle node 20 fails to join the mesh network, the processing circuit 25 determines whether the blocking count is greater than a blocking threshold. If the blocking count is greater than the blocking threshold, it means that the processing circuit 25 has attempted, for multiple times, to join the mesh network by using the unblocked communication port, and has not yet successfully joined the mesh network. At this time, the processing circuit 25 turns on the blocked communication port and turns off the unblocked communication port, so that the idle node 20 joins the mesh network by communicatively connecting to the first backhaul station 13A to 13C of one of the access points 10A to 10C through the blocked communication port (step S312). In other words, the processing circuit 25 changes to use the blocked communication port to join the mesh network. If the blocking count is not greater than the blocking threshold, the processing circuit 25 returns to step S304 and its subsequent steps, to continue attempting to join the mesh network by using the unblocked communication port. In this way, in the on-boarding phase, the communication port of the idle node 20 suitable for the communication connection with the access points 10A to 10C can be selected by using the mechanism of the STP. In some embodiments, the blocking threshold may be stored in the processing circuit 25 in advance. In some embodiments, the blocking threshold may be 5 times.

In some embodiments, after the processing circuit 25 joins the mesh network by using the blocked communication port, the processing circuit 25 unblocks the blocked communication port, and blocks the unblocked communication port. In this way, the disconnection of the network loop is maintained continuously.

In some embodiments of the step S304, when the two communication ports (that is, the first communication port 231 and the second communication port 233) have the same path cost, the processing circuit 25 compares port identities of the two communication ports, and blocks the communication port having a lower priority between the two communication ports. For example, when the idle node 20 is located in an environment with poor signal quality, the transmission speed of the two communication ports may be poor and the two communication ports may have the same high path cost. That is to say, in this embodiment, it may not be possible to determine the communication port to be blocked by comparing the path costs of the two communication ports. Therefore, the processing circuit 25 may determine the communication port to be blocked by further comparing the port identities of the two communication ports. The port identities may be assigned to the two communication ports by the processing circuit 25, and different port identities are distinguished by different codes (hereinafter referred to as port identity codes). The port identity code is determined according to a network type of each communication port. In other words, ports with different network types have different port identity codes. The different network types may be distinguished by different frequency bands in which the communication ports operate. That is to say, the port identities are related to the frequency bands in which the two communication ports operate. In some embodiments, the port identity code is smaller when the frequency band is higher, and the port identity code is larger when the frequency band is lower. A smaller port identity code indicates a higher priority value of the port, and a larger port identity code indicates a lower priority value of the port. For example, the first frequency band of the first communication port 231 is 5 GHz, and the second frequency band of the second communication port 233 is 2.4 GHz. Thus, the port identity code of the first communication port 231 may be "0", the port identity code of the second communication port 233 may be "1", and the second communication port 233 has a lower priority compared to the first communication port 231.

In step S314, the processing circuit 25 compares port identities of the two communication ports (that is, the first communication port 231 and the second communication port 233). The port identities are related to the frequency bands in which the two communication ports operate. Because the port identity described in step S314 is the same as the port identity described in step S304, the description will not be repeated. In step S316, the processing circuit 25 turns off the communication port having a lower priority between the two communication ports, so that the idle node 20 joins the mesh network by communicatively connecting to the first backhaul station 13A to 13C of one of the access points 10A to 10C through the turned on communication port. Because the priority of the communication port described in step S316 is the same as the priority of the communication port described in step S304, the description will not be repeated. Compared with step S304 and step S306 (that is, the first mode), in step S314 and step S316 (that is, the second mode), the mechanism of the STP and the action of blocking the communication port are omitted, the communication port having a lower priority between the two communication ports is directly turned off, and the communication port that is not turned off is used to join the mesh network. In this way, computing resources of the processing circuit 25 can be saved, and a time of the on-boarding phase can be shortened.

In some embodiments, similar to step S308, the processing circuit 25 accumulates a turning off count (hereinafter referred to as a first turning off count) of the communication port having a lower priority between the two communication ports in the on-boarding phase. For example, in the on-boarding phase, the processing circuit 25 performs multiple handshaking procedures. In each handshaking procedure, the processing circuit 25 turns off the communication port having a lower priority between the two communication ports again, and reattempts to join the mesh network through the communication port which is not turned off. That is to say, in the on-boarding phase, step S316 is executed for multiple times, and the first turning off count accumulated by the processing circuit 25 corresponds to the count that step S316 is executed. In some embodiments, the processing circuit 25 accumulates the first turning off count by using a counter.

In some embodiments, similar to steps S310 and S312, when the idle node 20 has not successfully joined the mesh network, the processing circuit 25 determines whether the first turning off count is greater than a turning off threshold. If the first turning off count is greater than the blocking threshold, it means that the processing circuit 25 has attempted, for multiple times, to join the mesh network by using the communication port which is not turned off, and has not yet successfully joined the mesh network. At this time, the processing circuit 25 changes to use the other communication port (that is, the communication port that is currently turned off) to join the mesh network. That is to say, the processing circuit 25 performs an update to replace the communication port through which the idle node 20 joins the mesh network. Specifically, the processing circuit 25 performs the update to turn on the currently turned off communication port and turn off the currently turned on communication port. Then, the processing circuit 25 controls the idle node 20 to use the communication port that is turned on after the update to join the mesh network. If the first turning off count is not greater than the turning off threshold, the processing circuit 25 re-executes step S316, to continue attempting to join the mesh network by using the communication port that is turned on before the update. In this way, in the on-boarding phase, the communication port of the idle node 20 suitable for the communication connection with the access points 10A to 10C can be selected. In some embodiments, the turning off threshold may be stored in the processing circuit 25 in advance. In some embodiments, the turning off threshold may be the same as or different from the blocking threshold.

Figure 4:
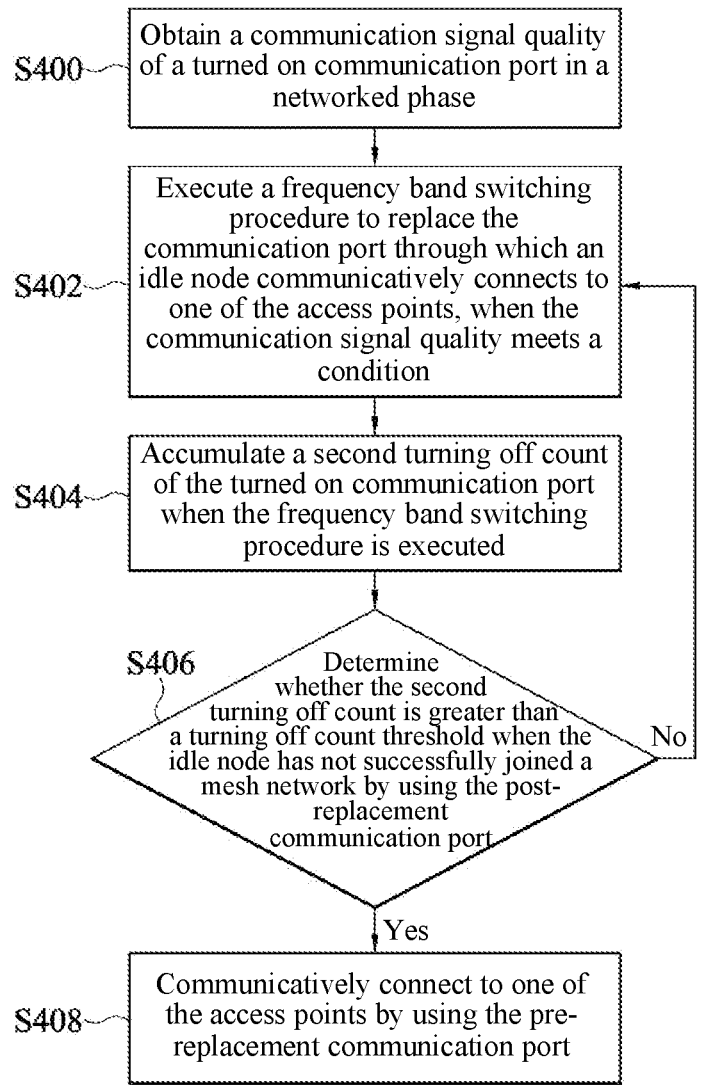
FIG. 4 is a schematic flowchart of the frequency band switching method for the mesh network in an networked phase according to some embodiments of the present invention.

Refer to FIG. 4, which is a schematic flowchart of the frequency band switching method for a mesh network in an networked phase according to some embodiments of the present invention. In some embodiments, similar to the on-boarding phase, one of the two communication ports is turned off and the other is turned on at any time point in the networked phase. In some embodiments, after the idle node 20 successfully joins the mesh network (that is, in the networked phase), the processing circuit 25 obtains a communication signal quality of the turned on communication port (step S400). In other words, the processing circuit 25 obtains the communication signal quality of the communication connection between the idle node 20 and the access points 10A to 10C. For example, assuming that the idle node 20 has successfully joined the mesh network by using the first communication port 231 in step S306, the processing circuit 25 obtains the communication signal quality of the first communication port 231; assuming that the idle node 20 has successfully joined the mesh network by using the second communication port 233 in step S312, the processing circuit 25 obtains the communication signal quality of the second communication port 233; and assuming that the idle node 20 has successfully joined the mesh network by using the first communication port 231 in step S316, the processing circuit 25 obtains the communication signal quality of the first communication port 231. In some embodiments, the communication signal quality may be implemented by an RSSI.

Next, when the communication signal quality meets a condition, the processing circuit 25 executes a frequency band switching procedure to replace the communication port through which the idle node 20 communicatively connects to one of the access points 10A to 10C (Step S402). Hereinafter, referring the communication port before the replacement as a pre-replacement communication port, and referring the communication port after the replacement as a post-replacement communication port. The frequency band switching procedure includes turning off the turned on communication port (i.e. the currently turned on communication port) and turning on the turned off communication port (i.e. the currently turned off communication port). For example, assuming that the idle node 20 joins the mesh network by using the first communication port 231 when the communication signal quality has not met the condition. When the communication signal quality of the first communication port 231 meets the condition, the idle node 20 turns off the first communication port 231, turns on the second communication port 233, and changes to use the second communication port 233 to join the mesh network. In this way, the operated frequency band can be switched (for example, switched from the first frequency band to the second frequency band) without the need to perform the handshaking procedure again (that is, without on-boarding again) when the communication signal quality meets the condition, thereby ensuring that the communication connection between the idle node 20 and the access points 10A to 10C can be maintained in a good state.

In some embodiments, the condition includes that the communication signal quality is less than or equal to a first communication quality threshold when the turned on communication port (i.e. the currently turned on communication port) is the first communication port 231. In some cases (such as noise interference in the environment), it may cause poor communication signal quality of the communication port of the idle node 20 that currently joins the mesh network. Specifically, when the communication signal quality is less than or equal to the first communication quality threshold, it indicates that the communication signal quality is poor. It is assumed that the communication port currently joining the mesh network (that is, the turned on communication port) has a higher frequency band than the turned off communication port. For example, the communication port currently joining the mesh network is the first communication port 231, the communication port currently turned off is the second communication port 233, the first frequency band of the first communication port 231 is higher than the second frequency band of the second communication port 233, and the transmission speed of the first communication port 231 is higher than that of the second communication port 233. When the communication signal quality of the first communication port 231 is less than or equal to the first communication quality threshold, the processing circuit 25 may switch to use the communication port having a lower frequency band (for example, the second communication port 233) to communicatively connect to the first backhaul station 13A to 13C of one of the access points 10A to 10C again. In other words, the communication connection between the idle node 20 and the access points 10A to 10C is maintained in a good state by reducing the transmission speed between the idle node 20 and the access points 10A to 10C.

In some embodiments, the condition further includes that a first duration time during which the communication signal quality is less than or equal to the first communication quality threshold reaches a second time threshold when the turned on communication port is the first communication port 231. In some cases, the communication signal quality may fluctuate, resulting in incorrect triggering of the frequency band switching procedure. It can be further determined whether the communication signal quality is in a poor state by determining whether the first duration time reaches the second time threshold, thereby preventing the frequency band switching procedure from being incorrectly triggered. In some embodiments, the second time threshold may be stored in the processing circuit 25 in advance. In some embodiments, the processing circuit 25 may accumulate the first duration time through a timer. In some embodiments, the first duration time may be 40 seconds.

In some embodiments, the condition includes that the communication signal quality is greater than or equal to a second communication quality threshold when the turned on communication port (i.e. the currently turned on communication port) is the second communication port 233. If the communication port currently joining the mesh network (that is, the turned on communication port) has a lower frequency band than the turned off communication port, the communication port 25 may switch to use the communication port having a higher frequency band to communicatively connect to the first backhaul station 13A to 13C of one of the access points 10A to 10C again, when the communication signal quality between the idle node 20 and the access points 10A to 10C is good. In this way, the transmission speed between the idle node 20 and the access points 10A to 10C may be increased while the communication connection between the idle node 20 and the access points 10A to 10C is maintained in a good state. In some embodiments, the second communication quality threshold is greater than the first communication quality threshold.

For example, the communication port currently joining the mesh network is the second communication port 233, the communication port currently turned off is the first communication port 231, the second frequency band of the second communication port 233 is less than the first frequency band of the first communication port 231, and the transmission speed of the second communication port 233 is lower than that of the first communication port 231. When the communication signal quality of the second communication port 233 is greater than or equal to the second communication quality threshold, the processing circuit 25 may switch to use the first communication port 231 to communicatively connect to the first backhaul station 13A to 13C of one of the access points 10A to 10C again.

In some embodiments, the condition further includes that a second duration time during which the communication signal quality is greater than or equal to the second communication quality threshold reaches a third time threshold when the turned on communication port is the second communication port 233. In some cases, the communication signal quality may fluctuate, resulting in incorrect triggering of the frequency band switching procedure. It can be further determined whether the communication signal quality is in an good state by determining whether the second duration time reaches the third time threshold, thereby preventing the frequency band switching procedure from being incorrectly triggered. In some embodiments, the third time threshold may be stored in the processing circuit 25 in advance. In some embodiments, the processing circuit 25 may accumulate the second duration time through a timer. In some embodiments, the third time threshold may be the same as or different from the second time threshold.

As shown in FIG. 4, when executing the frequency band switching procedure, the processing circuit 25 accumulates a turning off count (hereinafter referred to as a second turning off count) of the turned on communication port (step S404). When executing the frequency band switching procedure, the processing circuit 25 performs a network configuration procedure for multiple times, and the processing circuit 25 repeatedly turns off the same communication port in each network configuration procedure. That is to say, at the time of executing the frequency band switching procedure, the processing circuit 25 repeatedly turns off the communication port that is turned on when the frequency band switching procedure has not been executed. For example, assuming that when the communication signal quality has not met the condition (that is, the frequency band switching procedure has not been executed), the idle node 20 joins the mesh network by using the first communication port 231, the processing circuit 25 repeatedly turns off the first communication port 231 at the time of executing the frequency band switching procedure. In other words, when the frequency band switching procedure is executed, step S402 is executed for multiple times, and the second turning off count accumulated by the processing circuit 25 corresponds to the number of times that step S402 is executed. In some embodiments, the processing circuit 25 accumulates the second turning off count by using a counter.

Next, in the frequency band switching procedure, when the idle node 20 has not successfully joined the mesh network by using the post-replacement communication port, the processing circuit 25 determines whether the second turning off count is greater than a turning off count threshold (step S406). If the second turning off count is greater than the turning off count threshold, it means that the processing circuit 25 has attempted to join the mesh network by using the post-replacement communication port for multiple times, and has not yet successfully joined the mesh network. At this time, the processing circuit 25 changes to use the pre-replacement communication port to communicatively connect to the first backhaul station 13A to 13C of one of the access points 10A to 10C and to join the mesh network (step S408). If the second turning off count is not greater than the turning off count threshold, the processing circuit 25 returns to execute step S402 and its subsequent steps, to continue attempting to join the mesh network by using the post-replacement communication port.

Because in some cases, the access points 10A to 10C only support communication connections of a single frequency band, the communication connection with the access points 10A to 10C cannot be implemented through other frequency bands. In these cases, through step S406 and step S408, the frequency band for operation may not be switched when the communication signal quality meets the condition, thereby ensuring a continuous communication connection between the idle node 20 and the access points 10A to 10C. In some embodiments, the turning off count threshold may be stored in the processing circuit 25 in advance. In some embodiments, the turning off count threshold may be the same as or different from the blocking threshold, and may be the same as or different from the turning off threshold.

For example, assuming that the idle node 20 joins the mesh network by using the first communication port 231 when the communication signal quality has not met the condition (that is, the frequency band switching procedure has not been executed). When the communication signal quality of the first communication port 231 meets the condition, the idle node 20 repeatedly turns off the first communication port 231, repeatedly turns on the second communication port 233, and changes to use the second communication port 233 to attempt to join the mesh network. If the idle node 20 has not yet successfully joined the mesh network by using the second communication port 233 when the second turning off count is greater than the turning off count threshold, the processing circuit 25 resumes using the first communication port 231 to join the mesh network.

Figure 5:
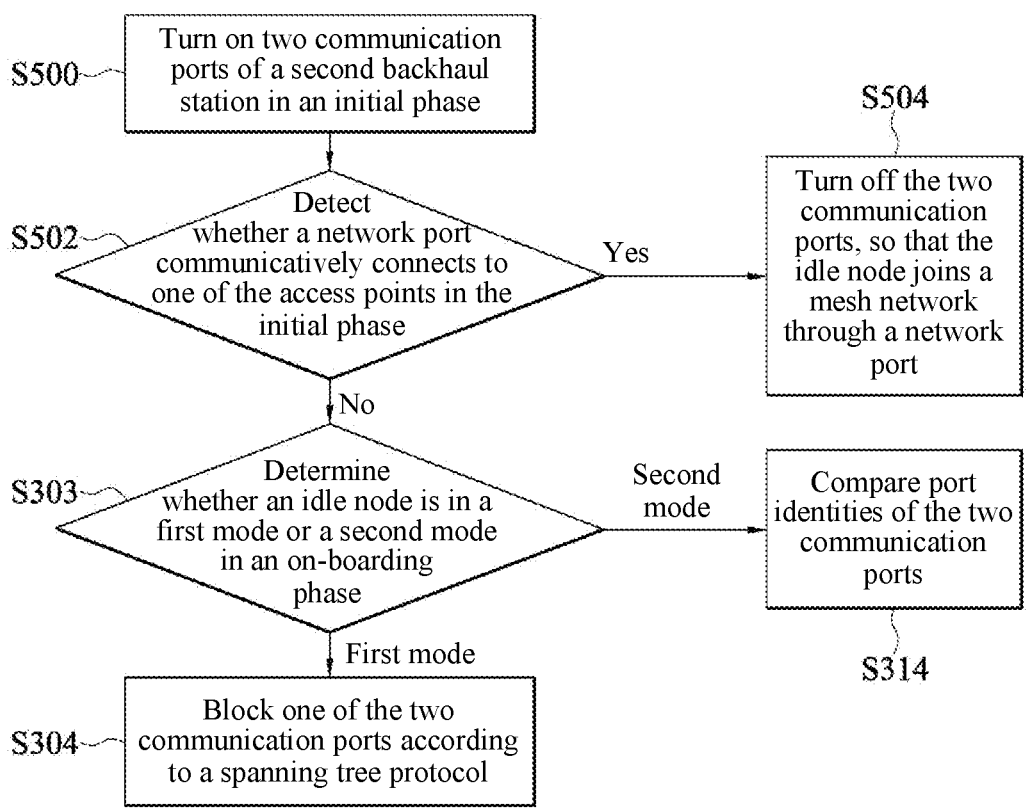
FIG. 5 is a schematic flowchart of the frequency band switching method for the mesh network in the on-boarding phase according to some embodiments of the present invention.

Refer to FIG. 5, which is a schematic flowchart of the frequency band switching method for a mesh network in the on-boarding phase according to some embodiments of the present invention. Here, because step S500 is the same as step S200, the description will not be repeated. In some embodiments, in the initial phase, the processing circuit 25 detects whether the network port 27 communicatively connects to one of the access points 10A to 10C (step S502). When detecting that the network port 27 communicatively connects to one of the access points 10A to 10C, the processing circuit 25 turns off the two communication ports (that is, the first communication port 231 and the second communication port 233), so that the idle node 20 joins the mesh network through the network port 27 (step S504). When detecting that the network port 27 does not communicatively connect to one of the access points 10A to 10C, the processing circuit 25 executes step S303 and its subsequent steps. The signal stability of wired communication is higher than that of wireless communication. Therefore, through step S502 and step S504, the network port 27 may be preferentially used to communicatively connect to the access points 10A to 10C when the network port 27 is used, thereby improving the signal stability between the idle node 20 and the access points 10A to 10C and avoiding the interference from wireless communication during wired communication. That is to say, compared to the wireless communication connection, the wired communication connection can be used preferentially.

Based on the above, according to some embodiments, the present invention can quickly switch between frequency bands without re-networking (re-on-boarding) (re-on-boarding). In some embodiments, the present invention can accurately select a frequency band used when a networking device (such as a node) is to join a local area network (such as a mesh network) in an on-boarding phase.

What is claimed is:

1. An apparatus for switching frequency band in a mesh network, wherein the mesh network comprises a plurality of access points, communicated to each other to form a mesh structure of the mesh network, wherein each of the access points comprises a first fronthaul station and a first backhaul station, and the first fronthaul station of each of the access points is configured to provide a communication connection for at least one user terminal, the apparatus comprising:
   a second fronthaul station, configured to provide a communication connection for the at least one user terminal after the apparatus joins the mesh network;
   a second backhaul station, comprising two communication ports, wherein the two communication ports comprise a first communication port and a second communication port, the first communication port is configured to operate in a first frequency band, and the second communication port is configured to operate in a second frequency band different from the first frequency band; and
   a processing circuit, configured to turn off one of the two communication ports in an on-boarding phase and when the two communication ports are turned on, so that the apparatus joins the mesh network by communicating with the first backhaul station of one of the access points through the turned on communication port.

2. The apparatus of claim 1, wherein the apparatus has a first mode, and in the on-boarding phase and when the two communication ports are turned on, in a case that the apparatus is in the first mode, the processing circuit is configured to:
   block one of the two communication ports according to a spanning tree protocol;
   turn off the blocked communication port, so that the apparatus joins the mesh network by communicatively connecting to the first backhaul station of one of the access points through the unblocked communication port;
   accumulate a blocking count of the blocked communication port in the on-boarding phase; and
   turn on the blocked communication port and turn off the unblocked communication port when the blocking count is greater than a blocking threshold and the apparatus has not joined the mesh network, so that the apparatus joins the mesh network by communicatively connecting to the first backhaul station of one of the access points through the blocked communication port.

3. The apparatus of claim 2, wherein the blocking one of the two communication ports according to the spanning tree protocol is that, when the two communication ports have the same path cost, the processing circuit compares port identities of the two communication ports, and blocks the communication port having a lower priority between the two communication ports, wherein the port identities are related to the frequency bands in which the two communication ports operate.

4. The apparatus of claim 1, wherein the apparatus has a second mode, the processing circuit accumulates a startup time in an initial phase, and the apparatus enters the on-boarding phase when the startup time is greater than a first time threshold, wherein in the on-boarding phase and when the two communication ports are turned on, in a case that the apparatus is in the second mode, the processing circuit is configured to:
   compare port identities of the two communication ports; and
   turn off the communication port having a lower priority between the two communication ports, so that the apparatus joins the mesh network by communicatively connecting to the first backhaul station of one of the access points through the turned on communication port, wherein the port identities are related to the frequency bands in which the two communication ports operate.

5. The apparatus of claim 1, wherein the processing circuit obtains a communication signal quality of the turned on communication port after the apparatus joins the mesh network, and when the communication signal quality meets a condition, the processing circuit executes a frequency band switching procedure to replace the communication port through which the apparatus communicatively connects to one of the access points, wherein the frequency band switching procedure comprises turning off the turned on communication port and turning on the turned off communication port.

6. The apparatus of claim 5, wherein the condition comprises that the communication signal quality is less than or equal to a first communication quality threshold when the turned on communication port is the first communication port.

7. The apparatus of claim 6, wherein the condition further comprises that a first duration time during which the communication signal quality is less than or equal to the first communication quality threshold reaches a second time threshold.

8. The apparatus of claim 5, wherein the condition comprises that the communication signal quality is greater than or equal to a second communication quality threshold when the turned on communication port is the second communication port.

9. The apparatus of claim 8, wherein the condition further comprises that a second duration time during which the communication signal quality is greater than or equal to the second communication quality threshold reaches a third time threshold.

10. The apparatus of claim 5, wherein when executing the frequency band switching procedure, the processing circuit accumulates a turning off count of the turned on communication port, and when the turning off count is greater than a turning off count threshold, the processing circuit uses the communication port before the replacement to communicatively connect to the first backhaul station of one of the access points.

11. The apparatus of claim 1, wherein the apparatus further comprises a network port, the processing circuit detects whether the network port communicatively connects to one of the access points, and the processing circuit turns off the two communication ports when detecting that the network port communicatively connects to one of the access points, so that the apparatus joins the mesh network through the network port.

12. A method for switching frequency band in a mesh network, wherein the mesh network comprises a plurality of access points, the method comprising:
turning off one of two communication ports of a second backhaul station of an idle node when the idle node is in an on-boarding phase and the two communication ports are turned on, so that the idle node joins the mesh network by communicatively connecting to a first backhaul station of one of the access points through the turned on communication port, wherein the two communication ports comprises a first communication port and a second communication port, the first communication port is configured to operate in a first frequency band, and the second communication port is configured to operate in a second frequency band different from the first frequency band;
wherein the access points are communicatively connected to each other to form a mesh structure of the mesh network, a first fronthaul station of each of the access points is configured to provide a communication connection for at least one user terminal, and a second fronthaul station of the idle node is configured to provide a communication connection for the at least one user terminal after the idle node joins the mesh network.

13. The method of claim 12, wherein the idle node has a first mode, and when the idle node is in the on-boarding phase, the method further comprises the following steps:
blocking one of the two communication ports according to a spanning tree protocol in the on-boarding phase and when the two communication ports are turned on, in a case that the idle node is in the first mode;
turning off the blocked communication port, so that the idle node joins the mesh network by communicatively connecting to the first backhaul station of one of the access points through the unblocked communication port;
accumulating a blocking count of the blocked communication port in the on-boarding phase; and
turning on the blocked communication port and turning off the unblocked communication port when the blocking count is greater than a blocking threshold and the idle node has not joined the mesh network, so that the idle node joins the mesh network by communicatively connecting to the first backhaul station of one of the access points through the blocked communication port.

14. The method of claim 13, wherein the step of blocking one of the two communication ports according to the spanning tree protocol comprises: comparing port identities of the two communication ports when the two communication ports have the same path cost, and blocking the communication port having a lower priority between the two communication ports, wherein the port identities are related to the frequency bands in which the two communication ports operate.

15. The method of claim 12, wherein the idle node has a second mode, and the frequency band switching method for the mesh network further comprises: accumulating a startup time in an initial phase; and entering the on-boarding phase when the startup time is greater than a first time threshold; and the method further comprises the following steps when the idle node is in the on-boarding phase:
comparing, in a case that the idle node is in the second mode, port identities of the two communication ports in the on-boarding phase and when the two communication ports are turned on; and
turning off the communication port having a lower priority between the two communication ports, so that the idle node joins the mesh network by communicatively connecting to the first backhaul station of one of the access points through the turned on communication port, wherein the port identities are related to the frequency bands in which the two communication ports operate.

16. The method of claim 12, further comprising:
obtaining a communication signal quality of the turned on communication port after the idle node joins the mesh network; and
executing a frequency band switching procedure to replace the communication port through which the idle node communicatively connects to one of the access points, when the communication signal quality meets a condition, wherein the frequency band switching procedure comprises turning off the turned on communication port and turning on the turned off communication port.

17. The method of claim 16, wherein the condition comprises that the communication signal quality is less than or equal to a first communication quality threshold when the turned on communication port is the first communication port, and a first duration time during which the communication signal quality is less than or equal to the first communication quality threshold reaches a second time threshold.

18. The method of claim 16, wherein the condition comprises that the communication signal quality is greater than or equal to a second communication quality threshold when the turned on communication port is the second communication port, and a second duration time during which the communication signal quality is greater than or equal to the second communication quality threshold reaches a third time threshold.

19. The method of claim 16, wherein in executing the frequency band switching procedure, a turning off count of the turned on communication port is further accumulated, and the communication port before the replacement is used to communicatively connect to the first backhaul station of one of the access points when the turning off count is greater than a turning off count threshold.

20. The method of 12, wherein the idle node further comprises a network port, and the frequency band switching method for the mesh network further comprises: detecting whether the network port communicatively connects to one of the access points, and turning off the two communication ports when detecting that the network port communicatively connects to one of the access points, so that the idle node joins the mesh network through the network port.

* * * * *